(12) United States Patent
Bocharov et al.

(10) Patent No.: US 8,392,748 B2
(45) Date of Patent: Mar. 5, 2013

(54) RELIABLE MEDIA STREAMING

(75) Inventors: John A. Bocharov, Seattle, WA (US); Geqiang (Sam) Zhang, Redmond, WA (US); Krishna Prakash Duggaraju, Renton, WA (US); Lin Liu, Sammamish, WA (US); Jimin Gao, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/611,136

(22) Filed: Nov. 3, 2009

(65) Prior Publication Data

US 2011/0083037 A1 Apr. 7, 2011

Related U.S. Application Data

(60) Provisional application No. 61/249,255, filed on Oct. 6, 2009.

(51) Int. Cl.
*G06F 11/00* (2006.01)
(52) U.S. Cl. .................. 714/4.11; 709/217; 709/231
(58) Field of Classification Search ............. 714/4.11; 370/216; 709/217, 231
See application file for complete search history.

(56) References Cited

U.S. PATENT DOCUMENTS

| | | | |
|---|---|---|---|
| 6,665,726 B1 * | 12/2003 | Leighton et al. | 709/231 |
| 6,839,865 B2 * | 1/2005 | Gould et al. | 714/6.3 |
| 7,076,544 B2 | 7/2006 | Katz et al. | |
| 7,159,234 B1 | 1/2007 | Murphy et al. | |
| 7,412,531 B1 | 8/2008 | Lango et al. | |
| 7,705,880 B2 * | 4/2010 | Dvir et al. | 348/143 |
| 2001/0027491 A1 * | 10/2001 | Terretta et al. | 709/238 |
| 2003/0120793 A1 * | 6/2003 | Marjola | 709/231 |
| 2004/0083273 A1 * | 4/2004 | Madison et al. | 709/217 |
| 2004/0249965 A1 | 12/2004 | Huggins et al. | |
| 2006/0230170 A1 | 10/2006 | Chintala et al. | |
| 2006/0248212 A1 * | 11/2006 | Sherer et al. | 709/231 |
| 2007/0153679 A1 | 7/2007 | Jost et al. | |
| 2009/0034633 A1 * | 2/2009 | Rodirguez et al. | 375/240.28 |
| 2010/0094973 A1 * | 4/2010 | Zuckerman et al. | 709/219 |
| 2011/0096828 A1 * | 4/2011 | Chen et al. | 375/240.02 |

OTHER PUBLICATIONS

Hwang, et al., "High-Availability Algorithms for Distributed Stream Processing", Retrieved at <<http://www.cs.brown.edu/research/aurora/hwang.icde05.ha.pdf>>, In the proceedings of In IEEE ICDE Conference, 2005, pp. 779-790.

Jin, et al., "Cache-and-Relay Streaming Media Delivery for Asynchronous Clients", Retrieved at <<http://www.cs.bu.edu/faculty/best/res/papers/ngc02.pdf>>, In Proceedings of the 4th International Workshop on Networked Group Communication,Oct. 2002, pp. 8.

(Continued)

*Primary Examiner* — Philip Guyton
(74) *Attorney, Agent, or Firm* — J. Mason Boswell; Boswell IP Law

(57) ABSTRACT

A reliable streaming system increases reliability of live and on-demand streaming media events through a robust server architecture that allows fast failover and recovery in the event of network, hardware, or other failures. The system provides for failover of encoders, ingest servers, which receive encoded media data from encoders, and origin servers, which serve as the retrieval point of last resort for connecting clients. The system also provides a push proxy mechanism that allows one copy of data to feed redundant servers and pre-warm caches, saving on provisioned bandwidth. In addition, the system provides a distribution server role that allows content to be automatically syndicated to a region when needed. Thus, the reliable streaming system provides a streaming solution with no single point of failure and redundancy and fast failover built into the content network architecture.

19 Claims, 5 Drawing Sheets

OTHER PUBLICATIONS

Foresman, Chris, et al., "Apple Proposes HTTP Streaming Feature as IETF Standard", Retrieved at <<http://arstechnica.com/web/news/2009/07/apple-proposes-http-streaming-feature-as-a-protocol-standard.ars>> Jul. 9, 2009, pp. 1-2.

Lim, et al., "A Proxy Caching Scheme for Continuous Media Streams on the Internet", Retrieved at <<http://ieeexplore.ieee.org/stamp/stamp.jsp?arnumber=905554&isnumber=19584>> In the proceedings of the 15th International Conference on Information Networking 2001, Aug. 7, 2002, pp. 720-725.

"HD Streaming for Italian Football", Retrieved at <<http://www.onwindows.com/Articles/HD-streaming-for-Italian-football/3867/Default.aspx>> Jun. 24, 2009, pp. 1-2.

"BANDCON Content Networking", Retrieved at <<http://www.am6.net/CDN_datasheet.pdf>>, Sep. 18, 2009, pp. 1-2.

\* cited by examiner

RELIABLE MEDIA STREAMING

CROSS-REFERENCE TO RELATED APPLICATIONS

The present application claims priority to U.S. Provisional Patent Application No. 61/249,255 entitled "RELIABLE MEDIA STREAMING," and filed on Oct. 6, 2009, which is hereby incorporated by reference.

BACKGROUND

Streaming media is multimedia that is constantly received by, and normally presented to, an end-user (using a client) while it is being delivered by a streaming provider (using a server). One problem with existing media streaming architectures is the tight coupling between server and client. A stateful connection between client and server creates additional server overhead, because the server tracks the current state of each client. This also limits the scalability of the server. In addition, the client cannot quickly react to changing conditions, such as increased packet loss, reduced bandwidth, user requests for different content or to modify the existing content (e.g., speed up or rewind), and so forth, without first communicating with the server and waiting for the server to adapt and respond. Often, when a client reports a lower available bandwidth, the server does not adapt quickly enough, causing breaks in the media to be noticed by the user on the client as packets that exceed the available bandwidth are not received and new lower bit rate packets are not sent from the server in time. To avoid these problems, clients often buffer data, but buffering introduces latency, which for live events may be unacceptable.

In addition, the Internet contains many types of downloadable media content items, including audio, video, documents, and so forth. These content items are often very large, such as video in the hundreds of megabytes. Users often retrieve documents over the Internet using HTTP through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Unfortunately, live media often cannot be cached using existing protocols, and each client requests the media from the same server or set of servers. In addition, when streaming media can be cached, it is often done by specialized cache hardware, not existing and readily available HTTP-based Internet caching infrastructure. The lack of caching limits the number of parallel viewers and requests that the servers can handle, and limits the attendance of a live event. The world is increasingly using the Internet to consume up to the minute live information, such as the record number of users that watched live events such as the opening of the 2008 Olympics via the Internet. The limitations of current technology are slowing adoption of the Internet as a medium for consuming this type of media content.

Moreover, reliably delivering media presentations and live events on the Internet depends on the ability to gracefully recover from errors without compromising the user experience. Current systems cannot silently absorb minor errors and glitches, and may experience catastrophic errors from which the systems cannot recover. Current systems attempt to solve these problems by over-utilizing limited or expensive resources such as bandwidth or redundant hardware.

SUMMARY

A reliable streaming system is described herein that increases reliability of live and on-demand streaming media events through a robust server architecture that allows fast failover and recovery in the event of network, hardware, or other failures. The system includes preparation for encoder failover, including support for using intentionally short-lived connections on lossy networks. The system provides for failover of ingest servers, which receive encoded media data from encoders, and origin servers, which serve as the retrieval point of last resort for connecting clients. The system also provides a push proxy mechanism that allows one copy of data to feed redundant servers and pre-warm caches, saving on provisioned bandwidth. In addition, media data is provided by the system in well-formed fragments (e.g., chunks) that are available at well-known URLs and are cacheable by existing Internet cache infrastructure. Finally, the system provides a distribution server role that allows content to be automatically syndicated to a region when needed. Thus, the reliable streaming system provides a streaming solution with no single point of failure and redundancy and fast failover built into the content network architecture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
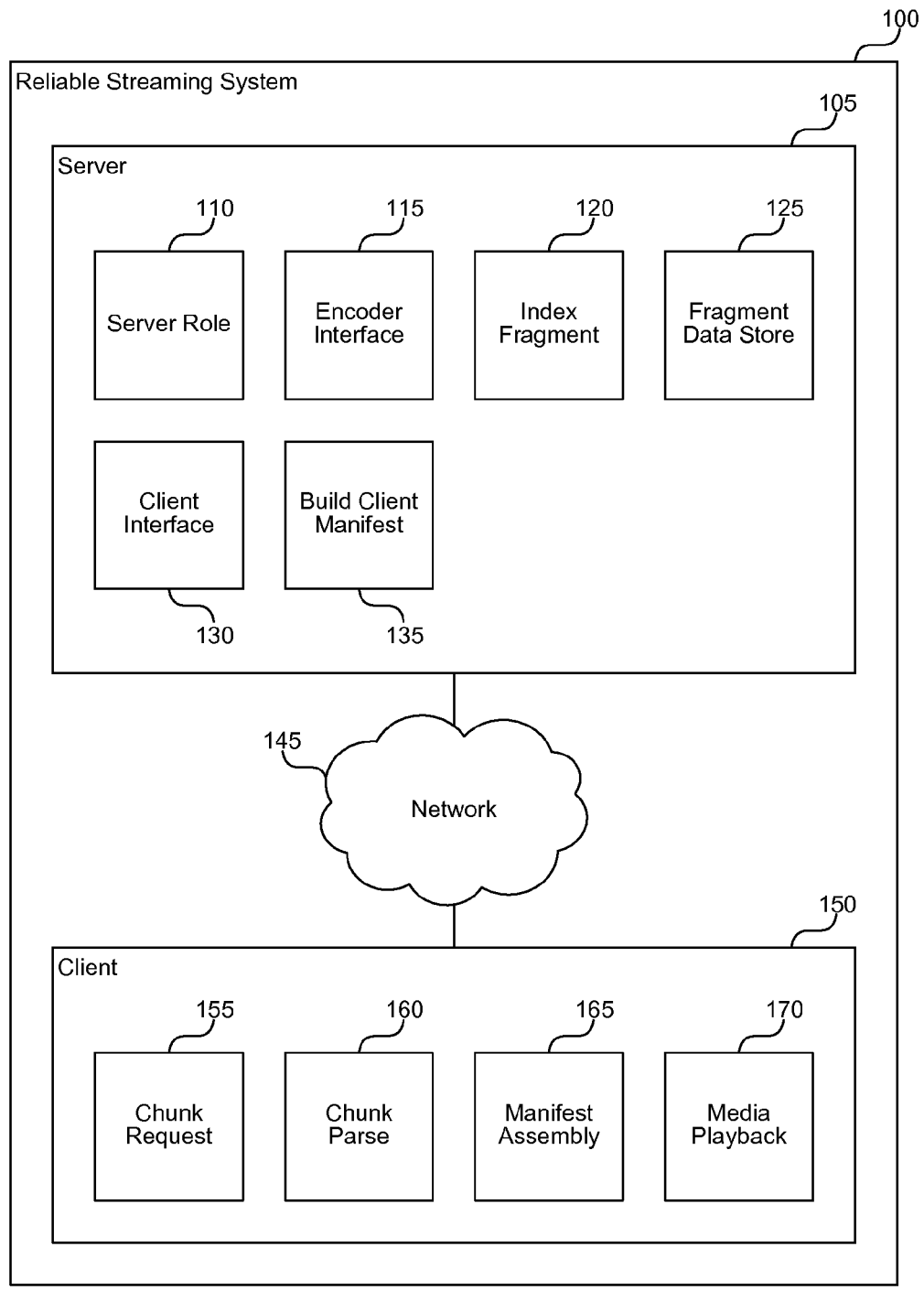
FIG. 1 is a block diagram that illustrates components of the reliable streaming system, in one embodiment.

A reliable streaming system is described herein that increases reliability of live and on-demand streaming media events through a robust server architecture that allows fast failover and recovery in the event of network, hardware, or other failures. The system includes preparation for encoder failover, including support for using intentionally short-lived connections on lossy networks. Some networks deprioritize long-lived connections by gradually decreasing the available bandwidth. While this may be appropriate for some network traffic, it can be particularly challenging for on-going traffic, such as a feed related to a television channel that broadcasts all the time or for long durations. The system also provides for failover of ingest servers, which receive encoded media data from encoders, and origin servers, which serve as the retrieval point of last resort for connecting clients. The system also provides a push proxy mechanism that allows one copy of data to feed redundant servers and pre-warm caches, saving on provisioned bandwidth. In addition, media data is provided by the system in well-formed fragments (e.g., chunks) that are available at well-known URLs and are cacheable by existing Internet cache infrastructure. Finally, the system provides a server role called a distribution server that allows content to be automatically syndicated to a region when needed. Thus, the reliable streaming system provides a streaming solution with no single point of failure and redundancy and fast failover built into the content network architecture.

In some embodiments, the reliable streaming system uses a particular data transmission format between the server and client. The client requests fragments of media from a server that include a portion of the media. For example, for a 10-minute file, the client may request two-second or smaller fragments. Note that unlike typical streaming where the server pushes data to the client, in this case the client pulls media fragments from the server. In the case of a live stream, the server may be creating the media on the fly and producing fragments to respond to client requests. Thus, the client may only be several fragments behind the server in terms of how fast the server creates fragments and how fast the client requests fragments.

Each fragment contains metadata and media content. The metadata may describe useful information about the media content, such as the bit rate at which the media content was encoded, where the media content fits into a larger media element (e.g., this fragment represents offset 1:10 in a 10 minute video clip), the codec used to encode the media content, and so forth. The client uses this information to place the fragment into a storyboard of the larger media element and to properly decode and playback the media content.

Each fragment of media provided by the system is referenced by clients using a tuple of, for example, publishing point path, track name, track attributes, and fragment start time, which is represented in a URL such as: http://<publishingpointpath>/QualityLevels(<trackattributes>)/Fragments (<trackname>=<fragmentstarttime>). To receive data from one or more data sources (which may include encoders, servers, or data insertion applications), the server can act in one of two modes for a given publishing point: 1) the server can listen for "push" connections on a URL (e.g., http://<publishingpointpath>/Streams(<uniqueid>)) where data is delivered using an HTTP POST, or 2) the server can "pull" data from other servers using an HTTP GET. The use of fragments and URL references facilitates mechanisms that can locate fragments across a redundant server topology.

FIG. 1 is a block diagram that illustrates components of the reliable streaming system, in one embodiment. The reliable streaming system 100 includes at least one server 105 and at least one client 150 connected by a network 145, such as the Internet. The server 105 includes a server role component 110, an encoder interface component 115, an index fragment component 120, a fragment data store 125, a client interface component 130, and a build client manifest component 135. Each of these components is described in further detail herein.

The server role component 110 receives configuration information that defines a particular server's role in a content network and prepares the server to carry out that role. For example, a particular server may act as an ingest server that receives data from one or more encoders, an origin server that provides a point of contact for clients to receive media fragments, or a distribution server that is part of a regional cache of media fragments. Each of these server roles is described further herein.

The encoder interface component 115 provides an interface between the system 100 and one or more encoders that provide encoded media data. The encoders may push data to the system 100 using common network protocols. For example, the encoders may use an HTTP POST request to provide encoded media data to the system 100. The encoders may each use a distinguished URL that specifies the encoder that is the source of the encoded media data, which the server may match to the information received by the register event component 110 when the media event was registered.

The encoder interface component 115 may specify a particular format for received encoded media data, such as an MP4 or other media container (e.g., MKV). The MP4 container format allows multiple types of data to be associated in a single file. The individual data that makes up an MP4 container is called a box, and each box typically has a label that identifies the type of data stored in the box. Encoders may place metadata information in the boxes such as the type of encoding used to encode the encoded media data, as well as the encoded media data itself.

The system 100 may configure encoders to lower overall latency produced by the system. For example, the system 100 may configure encoders not to include B-frames in streams so that the decoder can more quickly decode frames without waiting for subsequent frames to which B-frames would refer. In addition, the system 100 may instruct encoders to produce fragments that include less than a whole GOP, so that the encoder can push fragments to the server 105 more quickly.

The index fragment component 120 creates and maintains an index table of fragments received from various encoders. Because the system 100 is receiving media fragments on an on-going basis during an event from potentially many encoders, the system 100 uses the index table to keep track of what media fragments have been received and from which encoders (or in which formats). Each encoder may use a common method for identifying media fragments (e.g., a time stamp using a synchronized clock) so that the index fragment component 120 can correlate fragments from different encoders that represent the same period in a live event. In this way, the system 100 can detect when media fragments are missing and can provide clients with manifest information about available media fragments.

The fragment data store 125 stores received media fragments and the created index table of fragments to provide to clients in response to received client requests. The fragment data store may include a database, disk drive, or other form of data storage (e.g., a Storage Area Network (SAN) or a cloud-based storage service).

The client interface component 130 receives client requests for media fragments and provides manifest data and media fragments to clients. When a client initially connects to the system 100, the client may send a request for a client manifest. The client interface component 130 invokes the build client manifest component 135 to create a manifest that includes information about the encodings available from the system 100, and fragments stored by the system 100 up to the current time based on the index table. The client can use this information either to begin requesting ongoing live fragments, or to skip backwards in time to earlier portions of a presentation. The client can use this technique, for example, if the client joins a live event that is already in progress and wants to catch up with the previous portions of the event.

The build client manifest component 135 builds a manifest to satisfy a client request that includes information about each of the encodings available from the system 100 and fragments stored by the system 100 up to the current time. The build client manifest component 135 also provides a manifest to include with each media fragment that provides information to the client about the current media fragment as well as potentially subsequent fragments. By combining the initially received manifest with subsequent manifests provided with each media fragment, the client can build an up to date manifest that includes complete information about the media event from the start up until the current time. When the media event completes, the client has a complete storyboard of the media event that the client can use for on-demand viewing of the media event.

In some embodiments, the client interface component 130 responds to client requests for available fragments without waiting for subsequent fragments from which to include information with the current fragment. The client can request subsequent fragments by referencing the current fragment. For example, if the client last requested a fragment at time 1000, and wants the subsequent fragment, the client may send a request to get the fragment following the fragment at time 1000. In this way, the server can send fragments without introducing additional latency by waiting for subsequent fragments before sending a fragment.

The client 150 includes a chunk request component 155, a chunk parsing component 160, a manifest assembly component 165, and a media playback component 170. Each of these components is described in further detail herein.

Figure 2:
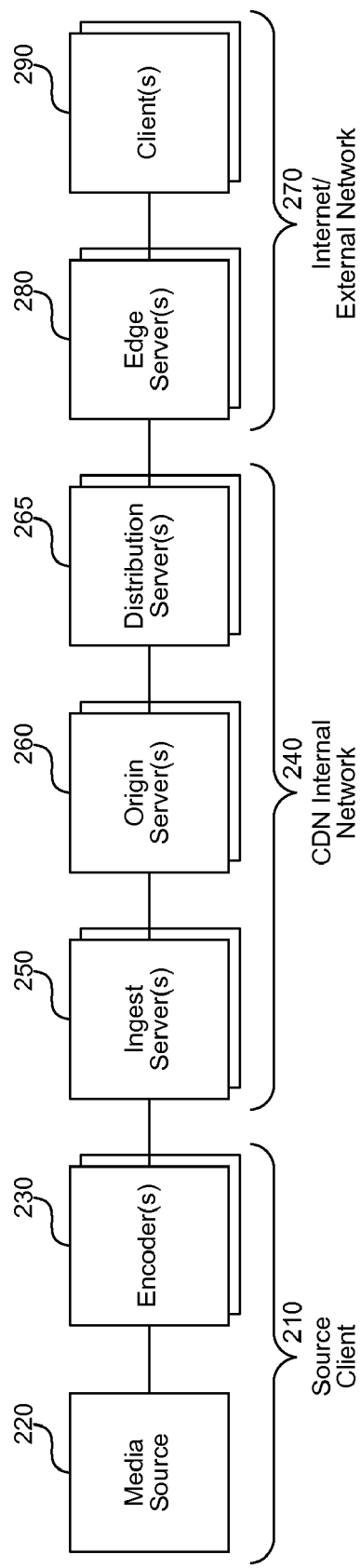
FIG. 2 is a block diagram that illustrates an operating environment of the reliable streaming system using Microsoft Windows and Microsoft Internet Information Server (IIS), in one embodiment.

The chunk request component 155 makes requests from the client for individual media chunks from the server. As shown in FIG. 2, the client's request may pass first to an edge server (e.g., an Internet cache), then to an origin server, and then to an ingest server. At each stage, if the requested data is found, then the request does not go to the next level. For example, if the edge server has the requested data, then the client receives the data from the edge server and the origin server does not receive the request. Each chunk may have a URL that individually identifies the chunk. Internet cache servers are good at caching server responses to specific URL requests (e.g., HTTP GET). Thus, when the first client calls through to the server 105 to get a chunk, the edge servers cache that chunk and subsequent clients that request the same chunk may receive the chunk from the edge server (based on the cache lifetime and server time to live (TTL) settings). The chunk request component 155 receives the chunk and passes it to the chunk parsing component 160 for interpretation. The chunk request component 1550 may request chunks by referencing a previous chunk (e.g., give me the chunk after chunk N).

The chunk parsing component 160 interprets the format of a media chunk received by the chunk request component 155 and separates the chunk into its component parts. Typically, the chunk includes a header portion containing metadata, and a data portion containing media content. The chunk parsing component provides the metadata to the manifest assembly component 165 and the media content to the media playback component 170. The media content may include mixed media types, such as video and audio data related to a presentation.

The manifest assembly component 165 builds a manifest that describes the media element to which received media content belongs. Large media files that clients download as a whole (i.e., not streamed) often include a manifest describing the whole file, the codecs and bit rates used to encode various portions of the file, markers about meaningful positions with the file, and so forth. During streaming, particularly live content, a server 105 cannot provide a complete manifest because the event is still ongoing. Thus, the server 105 provides as much of the manifest as it can through the metadata in the media chunks. The server 105 may also provide an application-programming interface (API), such as a predefined URL, for the client to request the manifest up to the current point in the media stream. This can be useful when the client 150 joins a live, streamed event after the event is already in progress. The manifest allows the client 150 to request previously streamed portions of the media element (e.g., by rewinding), and the client 150 continues to receive new portions of the manifest through the metadata of the streamed media chunks.

The manifest assembly component 165 builds a manifest similar to that available for a complete media file. Thus, as the event proceeds if the user wants to skip backwards in the media (e.g., rewind or jump to a particular position), then skip forward again, the user can do so and the client 150 uses the assembled manifest to find the appropriate chunk or chunks to playback to the user. When the user pauses, the system 100 may continue to receive media chunks (or only the metadata portion of chunks based on a distinguished request URL), so that the manifest assembly component 165 can continue to build the manifest and be ready for any user requests (e.g., skip to the current live position or play from the pause point) after the user is done pausing. The client-side assembled manifest allows the client 150 to play the media event back as on-demand content as soon as the event is over, and to skip around within the media event as it is going on.

The media playback component 170 plays back received media content using the client hardware. The media playback component 170 may invoke one or more codecs to interpret the container within which the media content is transported and to decompress or otherwise decode the media content from a compressed format to a raw format (e.g., YV12, RGBA, or PCM audio samples) ready for playback. The media playback component 170 may then provide the raw format media content to an operating system API (e.g., Microsoft DirectX) for playback on local computer system sound and video hardware, such as a display and speakers. The server 105 can influence latency on the client 150 by the encoding used. For example, encodings that include B-frames may cause the client to buffer received data longer before playing it back. By encoding video data without B-frames, the server can cause the client to playback video with less latency.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on. A "computer-readable storage device", as used herein, encompasses statutory storage devices and media that are common in the art and does not include non-statutory transmission media or data signals.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a block diagram that illustrates an operating environment of the reliable streaming system using Microsoft Windows and Microsoft Internet Information Server (IIS), in one embodiment. The environment typically includes a source client 210, a content delivery network 240, and an external network 270. The source client is the source of the media or live event. The source client includes a media source 220 and one or more encoders 230. The media source 220 may include cameras each providing multiple camera angles, microphones capture audio, slide presentations, text (such as from a closed captioning service), images, and other types of media. The encoders 230 encode the data from the media source 220 in one or more encoding formats in parallel. For example, the encoders 230 may produce encoded media in a variety of bit rates.

The content delivery network 240, where the reliable streaming system operates, includes one or more ingest servers 250, one or more origin servers 260, and zero or more distribution servers 265. The ingest servers 250 receive encoded media in each of the encoding formats from the encoders 230 and create a manifest describing the encoded media. The ingest servers 250 may create and store the media fragments described herein or may create the fragments on the fly as they are requested. The ingest servers 250 can receive pushed data, such as via an HTTP POST, from the encoders 230, or via pull by requesting data from the encoders 230. The encoders 230 and ingest servers 250 may be connected in a variety of redundant configurations. For example, each encoder may send encoded media data to each of the ingest servers 250, or only to one ingest server until a failure occurs. The origin servers 260 are the servers that respond to client requests for media fragments. The origin servers 260 may also be configured in a variety of redundant configurations. Distribution servers 265 provide regionally distributable caches that can be prepared for a particular media event, such as a live performance.

In some embodiments, the ingest servers 250 comprise one or more servers dedicated to ingesting encoder media streams. An administrator or content author may create a publishing point that defines a URL at which clients of the ingest servers 250 can find a particular media element (e.g., a live event). For example, using IIS, the administrator may publish a URL "http://ingserver/pubpoint.isml." The publishing point is used by the encoders 230 to provide new media data to the ingest servers 250 and by the origin servers 260 to request media data from the ingest servers 250. Each encoder may use a distinguished URL to connect to the ingest servers 250 so that the ingest servers 250 can detect different encodings of the same data. For example, based on the URL in the previous example, an encoder may send an HTTP POST to provide media data to the ingest server using the URL "http://ingserver/pubpoint.isml/Streams(stream1)." The ingest servers 250 store the received data for later retrieval by clients of the ingest servers 250 (e.g., the origin servers 260). The POST may contain various types of media formats, such as an MP4 container. An MP4 container contains various types of information, called boxes, that are typically labeled with a four-letter code, such as "ftyp" to describe the type of encoding used and "moov" to contain audiovisual data. Whether using MP4 or other container formats, the encoder may add additional boxes or information to the stream, such as a "ManifestBox" that contains a manifest describing the media element.

When the ingest servers 250 receive a request for data, the ingest servers 250 provide the data stored earlier. The ingest servers 250 may support several types of requests, including a request for encoder stream manifest that identifies the available encoder streams and a request for data from a specific stream (including portions of the stream data). The type of request may be identified by the URL of the request. For example, when the ingest servers 250 receive the URL "http://ingserver/pubpoint.isml/StreamManifest," the ingest servers 250 return an encoder manifest that contains identifiers for each available encoder. When the ingest servers 250 receives the URL "http://ingserver/pubpoint.ism/Streams(stream1)," the ingest servers 250 send a corresponding media stream for the encoder associated with the identifier "Encoder1" in response. The response may include the MP4 data, such as the cached "ftyp," "ManifestBox," and "moov" boxes described above followed by media fragments in a FIFO buffer. The ingest servers 250 may also receive partial data requests (e.g., during failover scenarios) of the form "http://ingserver/pubpoint.ism/Streams(stream1)/StartTime(12345678)," that cause the ingest servers 250 to skip sending "ftyp," "ManifestBox," and "moov" boxes and to try to start from the media fragment that is closest to the specified timestamp.

The origin servers 260 receive requests for media streams from media clients and retrieve requested media streams from one or more ingest servers 250. Like the ingest servers 250, an administrator or content author registers a publishing point on the origin server, and then associates the ingest servers 250 and/or encoder URLs with the publishing point. The origin servers 260 may first request (e.g., using an HTTP GET request) a manifest from the ingest servers 250 that describes the available streams. The origin server then submits separate requests for each encoder stream to the ingest server, and the ingest server responds with the requested media stream as received from the encoder.

The origin servers 260 may separately receive manifest information about the media stream and media fragments that represent parts of a larger media element being provided by the media stream. The origin servers 260 build an index of each fragment received from each stream based on a timestamp or other identifier provided by each encoder that allows the origin servers 260 to correlate data from each encoder. The origin servers 260 may build their own MP4 container or other storage format from the received data from which to respond to media client requests. By building a file of a known format from a live event, the origin server may be able to provide a unified download of a media file quickly after the event.

When the origin servers 260 receive a media client request, the origin servers 260 generate a client manifest by appending the index that the server has built to the static stream information received from the encoder manifest(s). If there are multiple streams, then the origin servers 260 merge the stream manifests into a comprehensive client manifest. This allows the client to be selective in which encoding type the client requests without obtaining further information from the origin servers 260. The server provides the manifest to the client using a standard response type that can be cached by existing Internet infrastructure, such as an HTTP response. Because the manifest data may change over time, the server may set a short cache timeout value (e.g., time to live (TTL)) on the manifest response.

The external network 270 includes edge servers 280 and other Internet (or other network) infrastructure and clients 290. When a client makes a request for a media fragment, the client addresses the request to the origin servers 260. Because of the design of network caching, if one of the edge servers 280 contains the data, then that edge server may respond to the client without passing along the request. However, if the data is not available at the edge server, then the edge server forwards the request to one of the distribution servers 265, which may forward the request to one of the origin servers 260. Likewise, if one of the origin servers 260 receives a request for data that is not available, the origin server may request the data from one of the ingest servers 250.

Distribution servers 265 can be used by a content network provider to protect origin servers for popular content and un-warm edge caches by consolidating requests from a particular region into one set of requests to the origin server. An origin server may periodically send data to keep a distribution server connection open to prevent sparse media data that is sent irregularly from the origin server to the distribution server from opening and closing many connections. Because distribution servers understand the content format and manifests, distribution servers can also be used to filter out malicious or erroneous requests from clients that are not valid (e.g., for fragments not identified in the manifest), further protecting origin servers.

Figure 3:
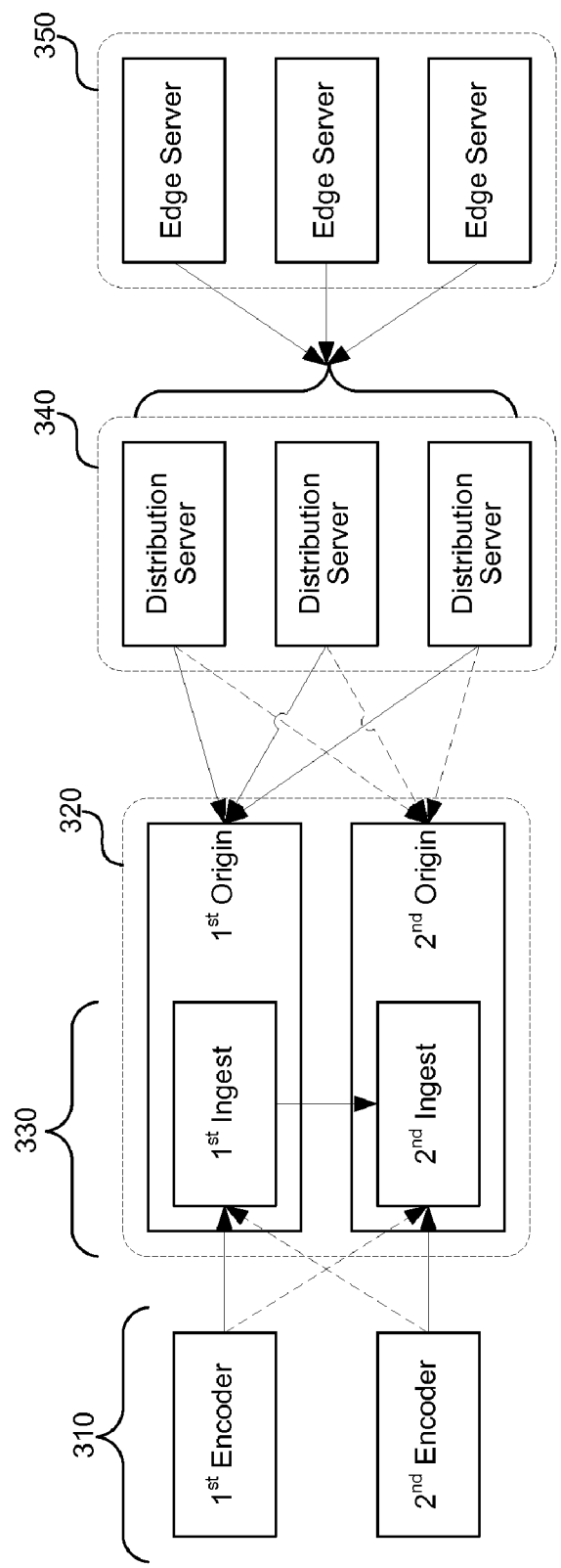
FIG. 3 is a data flow diagram that illustrates an example server topology using the reliable streaming system, in one embodiment.

FIG. 3 is a data flow diagram that illustrates an example server topology using the reliable streaming system, in one embodiment. The topology includes one or more encoders 310, one or more origin servers 320, one or more ingest servers 330, one or more distribution servers, and one or more edge servers 350. Redundant encoders can produce media fragments in a variety of ways. For example, the 1st encoder may initially provide media fragments to the 1st ingest server until the 1st encoder fails. If the 1st encoder fails then the 2nd encoder may start up and provide media fragments to the 1st or 2nd ingest server. Alternatively, both the 1st and 2nd encoders may regularly provide redundant media fragments to either or both of the 1st and 2nd ingest servers if bandwidth between the encoders and ingest servers is plentiful. The encoders may also initially split a workload, so that the 1st encoder produces media fragments for several bitrates offered by the system to clients, while the 2nd encoder produces media fragments for several other bitrates. The roles of the encoders 310 are configurable by an administrator. Unlike previous systems, which typically held a long running connection between a single encoder and ingest server, the reliable streaming system breaks the dependency between encoders and ingest servers. Because fragments can be produced by multiple encoders and can be identified as related (e.g., using a timestamp) regardless of the encoder that produced them, the ingest server no longer is limited to receiving fragments from a single encoder or holding a long running connection. In fact, one encoder could connect to the ingest server, post several media fragments, then another encoder could connect to the ingest server and post several more fragments of the same stream, each holding only a short connection. In addition, because the encoders push data the connection will work through firewalls and the encoder can use a simple web client rather than implementing a full web server.

Similarly, the ingest servers 330 can operate in a redundant fashion. Initially, the 1st ingest server may receive all of the data and the origin servers 320 may receive media fragments from the 1st ingest server. The 1st ingest server may also push received fragments to the 2nd ingest server in case the 1st ingest server fails. If the 1st ingest server fails, then the 2nd ingest server can inform the active encoder or encoders to send future fragments to the 2nd ingest server, and the 2nd ingest server can continue pushing the media fragments to the origin servers 320. Likewise, the origin servers 320 can act in a redundant fashion for the next layer of the content delivery network, the distribution servers 340 in the diagram. The distribution servers 340 may initially pull data from the 1st origin server, but if the 1st origin server fails, the distribution servers 340 can pull data from the 2nd origin server. In this way, the network topology provides a highly redundant content delivery network with no single point of failure. In addition, administrators can dynamically add new servers to the network and assign them an appropriate role. For example, if the encoders are overloaded or are experiencing a high failure rate, then the administrator can rotate in additional encoders. As another example, if certain regions were creating a high level of demand, then the administrator could deploy additional distribution servers 340 or repurpose existing servers in those regions to act as distribution servers 340 and ease the burden on the content network.

As shown, the encoder can upload a single copy of media fragments that the ingest server can replicate to a co-located origin server or other failover servers. This saves the encoder bandwidth, as it gets the benefit of failover while uploading only one copy of the data. In addition, over a lossy encoder/server link, it is often desirable to have an ingest server onsite with the encoder that pushes data to an origin server. This allows a complete local archive to be kept in cases of catastrophic link failure, and can leverage all server-to-server resiliency features to ensure quality of service across the connection.

Figure 4:
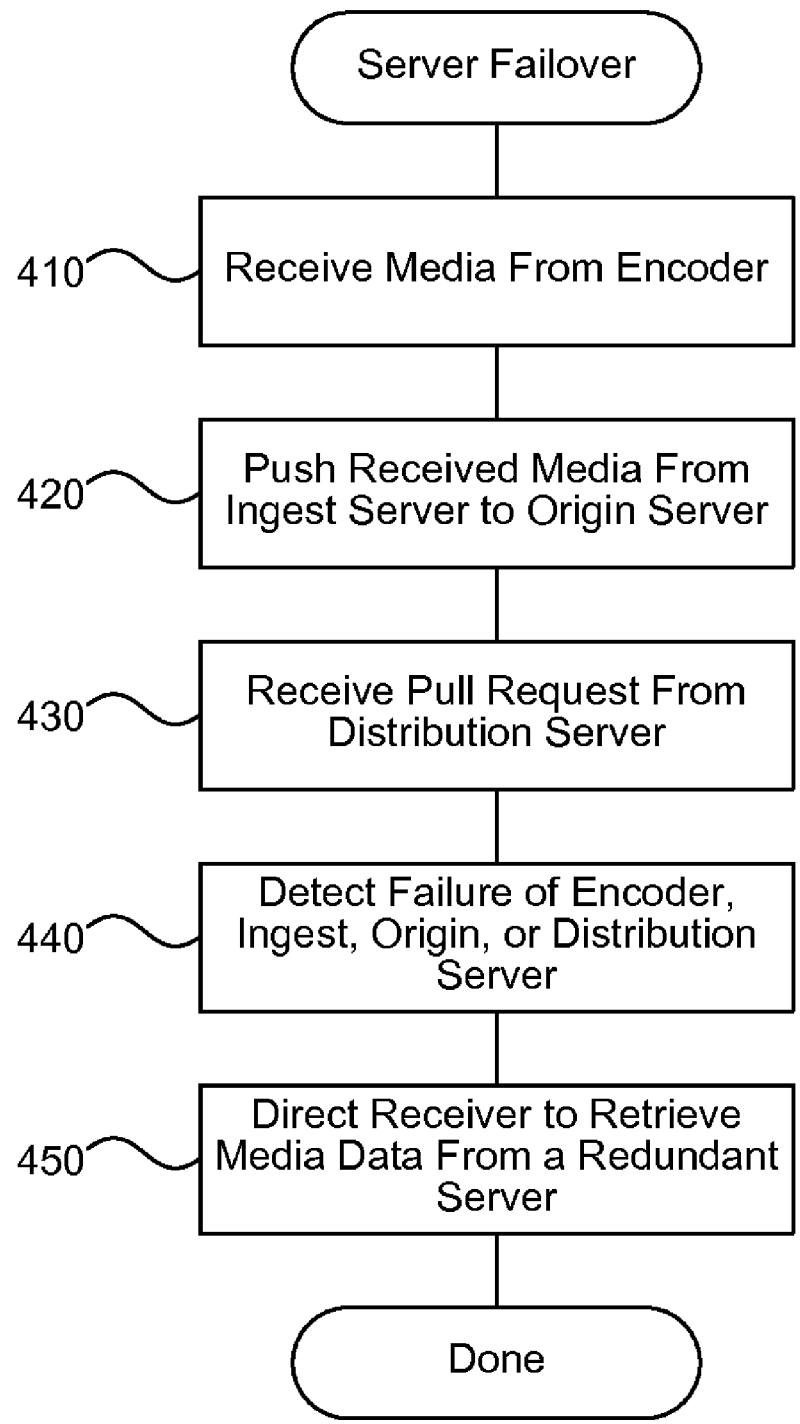
FIG. 4 is a flow diagram that illustrates an example of server failover using the reliable streaming system, in one embodiment.

FIG. 4 is a flow diagram that illustrates an example of server failover using the reliable streaming system, in one embodiment. Beginning in block 410, the system receives encoded media data from at least one encoder for a media stream, wherein the encoded data is pushed to an ingest server. For example, the system may include redundant encoders and ingest servers, as illustrated in FIG. 3. Continuing in block 420, the system pushes the received encoded media data from the ingest server to at least one origin server. For example, the system may also include redundant origin servers. Continuing in block 430, the system receives from at least one distribution server a request to pull data from the origin server. For example, the system may include distribution servers in each of several regions that retrieve and cache data from the origin server(s).

Continuing in block 440, the system determines that at least one of the encoder, the ingest server, the origin server, or the distribution server has experienced a failure that disrupts transmission of the media data. For example, an encoder may fail and the system may direct a second encoder to begin providing media data to the ingest server. As another example, an ingest server may fail and the system may direct a second ingest server to begin providing media data to origin servers. Continuing in block 450, the system directs a receiver of media data to retrieve the media data from a redundant server with access to the encoded media data. After block 450, these steps conclude.

Figure 5:
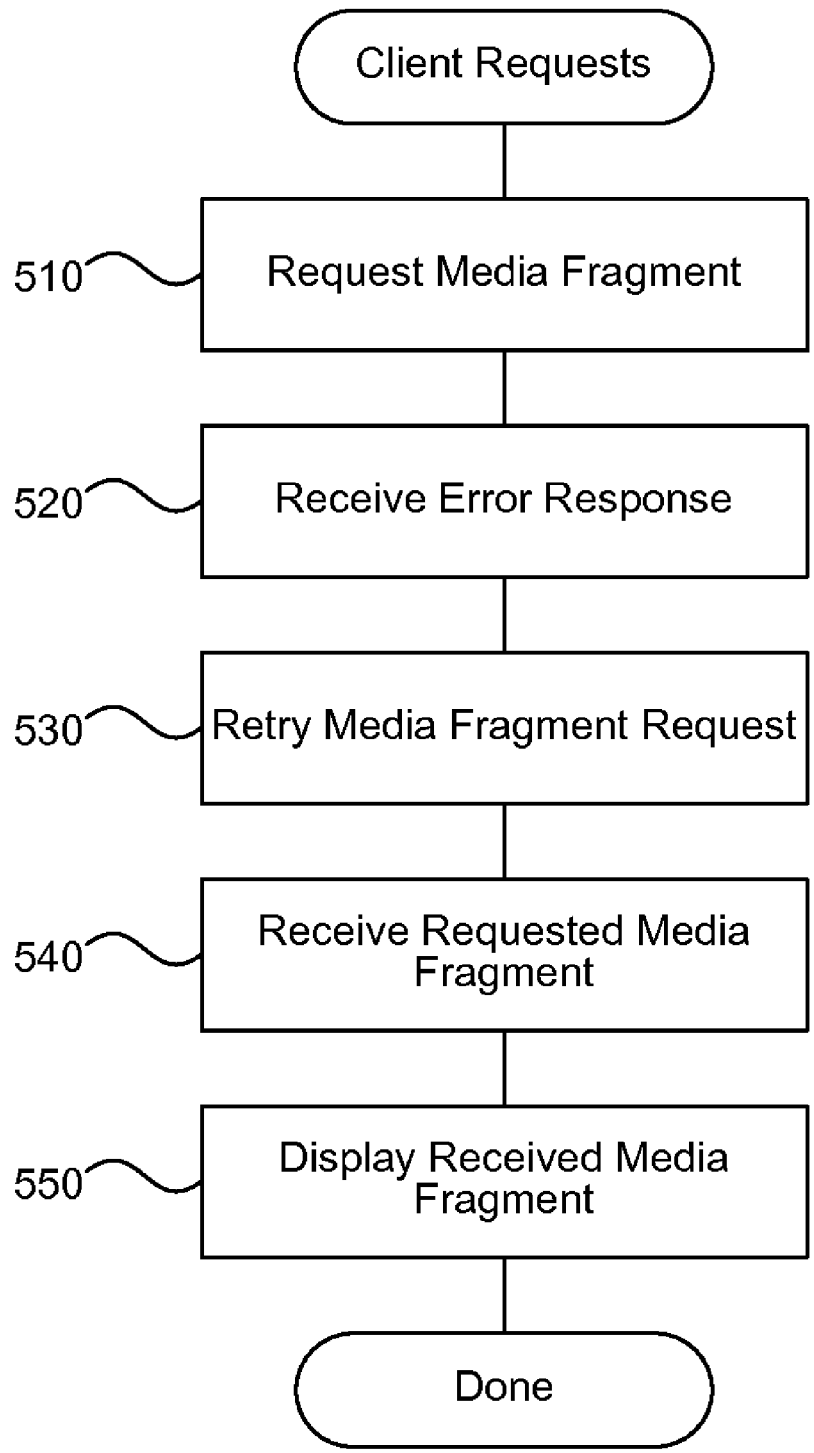
FIG. 5 is a flow diagram that illustrates client requests to a server topology in accordance with the reliable streaming system, in one embodiment.

FIG. 5 is a flow diagram that illustrates client requests to a server topology in accordance with the reliable streaming system, in one embodiment. Beginning in block 510, the client requests a media fragment associated with a streaming media presentation. For example, the client may be periodically requesting fragments that contain audio and video related to a live event. Continuing in block 520, the client receives an error indicating that the fragment could not be retrieved from a first server. For example, the client may request the fragment from a domain name server (DNS) address that resolves to the Internet Protocol (IP) address of a first origin server that has gone down or been taken offline. Continuing in block 530, the client retries the request for the media fragment by sending the request to a second redundant server containing the media fragment. Using the previous example, the client may retry the request to the same DNS address that now resolves to the IP address of a second origin server. In some embodiments, an intervening server between the client and origin server may mask the failure from the client. For example, distribution servers may failover automatically and retry the request on the client's behalf so that the client only sees a successful response to the original request.

Continuing in block 540, the client receives the requested media fragment. For example, the client may receive a "200 OK" response to an HTTP GET request for the fragment that includes the data of the fragment along with any related metadata. Continuing in block 550, the client displays the received media fragment without interruption to the streaming media presentation. If the client is able to retry and receive the media fragment in a fast amount of time relative to the length of each fragment and the pace of the presentation, then the client will have the fragment in time to continue playing media from the fragment without any user interruption. Even though a server went down, the system is able to automatically recover without administrator intervention and with little or no interruption to clients. After block 550, these steps conclude.

In some embodiments, the reliable streaming system configures distribution servers to start pulling data only after requested by a client. This allows distribution servers to be prepared for heavy loads, but to avoid consuming bandwidth unless those loads occur. For example, a partner of a content provider may know that a particular movie or audio CD will be released on a particular day, and may contract for a certain level of bandwidth to be available from the content provider to support the release. The content provider can prepare a distribution server to be ready for the load in a region where the content will be released. However, if other events preempt consumers' desire for the item, the distribution server will not consume unnecessary bandwidth retrieving fragments related to the item without corresponding client requests.

In some embodiments, the reliable streaming system configures distribution servers to cache a predetermined period of media data. For example, an administrator may configure the distribution servers to cache the last N minutes of a media presentation. This may be helpful for media presentations that are expected to be viewed live or with a slight delay, but that are unlikely to be viewed after they become stale.

In some embodiments, the reliable streaming system employs smart caching technology to rotate content cached by elements of the system. For example, the reliable streaming system may work with Application Request Routing (ARR) of Microsoft IIS to discard cached media fragments that have not been requested for a certain time or that are unlikely to be requested in the future. In addition, the system may prioritize frequently requested fragments or fragments with expected high demand and keep such fragments in the cache longer.

In some embodiments, the reliable streaming system allows clients to view previously live content on-demand after the live event has concluded. The same media fragments that clients retrieved during the live event can also be retrieved by clients connecting after the event has occurred. These fragments may also be available from Internet cache servers without a particular request reaching a content network.

In some embodiments, the reliable streaming system produces segmented archives for long running media presentations by splitting the archive of media fragments along time boundaries into distinct on-demand presentations. For example, a particular media stream may run all the time (e.g., a television channel), but clients may only be allowed to skip back to view the previous two hours. The system allows this by segmenting the ongoing manifest into a new manifest or a marker in the manifest that makes the presentation appear to be only two hours long. This allows the client to display a seek bar with an appropriate duration of available past media data. In addition, the client and server may delete fragments that fall outside of the trailing archive window to recover disk space. An administrator can also segment the archive according to other criteria. For example, the administrator could carve out a particular hour of a much longer live media presentation and save the hour as a single on-demand media presentation. The server saves the appropriate media fragments and produces a manifest that corresponds to the selected hour of the presentation.

The reliable streaming system may request and receive media content in a variety of encodings. In some embodiments, the reliable streaming system uses custom MP4 boxes. The Motion Picture Experts Group (MPEG) version 4 standard provides for boxes within the format that can contain custom data. The MP4 extension is the file format commonly associated with this version of content. The system may leverage boxes to include the custom metadata and media content chunks. Other media formats provide similar customization of content within a container and may be used by the system.

In some embodiments, the reliable streaming system conforms to the guidelines of the Representational State Transfer (REST) style of software architecture for distributed hypermedia systems. One concept in REST is that an application can interact with a resource by knowing only the identifier of the resource (e.g., a URI) and the action requested (e.g., retrieval), and without knowing whether there are caches, proxies, gateways, firewalls, tunnels, or anything else between the application and the server actually holding the information. Following REST guidelines allows the system to use existing Internet infrastructure and pre-existing resource-conserving techniques such as caching. Some example REST-based principles that the system implements in some embodiments include: each URI identifies exactly one response, each URI points to a server resource that is stateless and cacheable, and each URI is intuitive and uses nouns (verbs are HTTP verbs). In particular, the system may avoid making requests using query strings and may use substantially unique keys for start times that are requested via URLs.

From the foregoing, it will be appreciated that specific embodiments of the reliable streaming system have been described herein for purposes of illustration, but that various modifications may be made without deviating from the spirit and scope of the invention. Accordingly, the invention is not limited except as by the appended claims.

We claim:

1. A computer-implemented method for providing failover in a streaming media system, the method comprising:
- receiving encoded media data from at least one encoder for a media stream, wherein the encoded data is pushed to an ingest server;
- pushing the received encoded media data from the ingest server to multiple origin servers so that the encoder consumes bandwidth for transmitting a single copy of the media data but gains failover provided by two or more origin servers;
- receiving from at least one distribution server a request to pull data from the origin server;
- determining that at least one of the encoder, the ingest server, the origin server, or the distribution server has experienced a failure that disrupts transmission of the media data; and
- directing a receiver of the media data to retrieve the media data from a redundant server with access to the encoded media data,
- wherein the preceding steps are performed by at least one processor.

2. The method of claim 1 wherein determining that at least one of the encoder, the ingest server, the origin server, or the distribution server has experienced a failure comprises determining that the encoder has failed and wherein directing a receiver of the media data to retrieve the media data from a redundant server comprises directing a second encoder to provide encoded media data to the ingest server.

3. The method of claim 1 wherein determining that at least one of the encoder, the ingest server, the origin server, or the distribution server has experienced a failure comprises determining that the ingest server has failed and wherein directing a receiver of the media data to retrieve the media data from a redundant server comprises directing a second ingest server to provide encoded media data to the origin server.

4. The method of claim 1 wherein determining that at least one of the encoder, the ingest server, the origin server, or the distribution server has experienced a failure comprises determining that the origin server has failed and wherein directing a receiver of the media data to retrieve the media data from a redundant server comprises directing a second origin server to provide encoded media data to the distribution server.

5. The method of claim 1 wherein receiving encoded media data from at least one encoder for a media stream comprises receiving redundant encoded media data from multiple encoders at the same time.

6. The method of claim 1 wherein receiving from at least one distribution server a request to pull data from the origin server comprises receiving the request in response to a client request.

7. The method of claim 1 wherein pushing the received encoded media data from the ingest server to at least one origin server further comprises pushing the received encoded media data from the ingest server to a second ingest server for redundancy.

8. The method of claim 1 wherein pushing the received encoded media data from the ingest server to at least one origin server further comprises pushing the received encoded media data from the ingest server to a second origin server for redundancy.

9. A computer system for reliably streaming media events, the system comprising:
- a processor and memory configured to execute software instructions;
- a server role component configured to receive configuration information that defines a particular server's role in a content network and prepares the server to carry out that role;
- an encoder interface component configured to provide an interface between the system and one or more encoders that provide encoded media data as continuous media fragments, wherein each encoder pushes received encoded media data to an ingest server and then to multiple origin servers so that the encoder consumes bandwidth for transmitting a single copy of the media data but gains failover provided by two or more origin servers;
- an index fragment component configured to create and maintain an index table of media fragments received from encoders;
- a fragment data store configured to store received media fragments and the created index table of fragments to provide to clients based on received client requests;
- a client interface component configured to receive client requests for media fragments and provide manifest data and requested fragments to clients.

10. The system of claim 9 wherein the server role component is further configured to receive a role selected from the group consisting of an encoder, an ingest server, an origin server, and a distribution server.

11. The system of claim 9 wherein the server role component is further configured to specify communication of received media fragments between multiple servers.

12. The system of claim 9 wherein the server role component is further configured to cause a server acting in the role of an encoder to transmit media fragments to multiple ingest servers.

13. The system of claim 9 wherein the server role component is further configured to cause a server acting in the role of an ingest server to transmit media fragments to multiple origin servers.

14. The system of claim 9 wherein the server role component is further configured to cause a server acting in the role of a distribution server to pull media fragments from one or more origin servers.

15. The system of claim 9 wherein the client interface component is further configured to create segmented archives that provide a portion of a live media event on-demand as a standalone media presentation.

16. A computer-readable storage device comprising instructions for controlling a computer system to reliably receive media fragments over a network, wherein the instructions, when executed, cause a processor to perform actions comprising:
- requesting a media fragment associated with a streaming media presentation;
- receiving an error indicating that the fragment could not be retrieved from a first server;
- retrying the request for the media fragment by sending the request to a second redundant server containing the media fragment, wherein the second redundant server was previously sent the media fragment from an ingest server that provided the fragment to multiple origin servers so that an encoder consumes bandwidth for transmitting a single copy of the media data but gains failover provided by two or more origin servers;
- receiving the requested media fragment; and
- displaying the received media fragment without interruption to the streaming media presentation.

17. The device of claim 16 wherein retrying the request comprises sending the request to a second origin server configured to handle failover for a first origin server.

18. The device of claim 16 wherein receiving the requested media fragment comprises receiving the media fragment from a second encoder that provides redundant fragments related to fragments produced by a first encoder and wherein each encoder identifies fragments by associating a timestamp with each fragment.

19. The device of claim 16 wherein receiving the requested media fragment comprises receiving the fragment from a distribution server geographically closer to the client than an origin server.

* * * * *